US012677181B2

(12) United States Patent
Sevin et al.

(10) Patent No.: US 12,677,181 B2
(45) Date of Patent: Jul. 7, 2026

(54) DECLARATION OF LOW LATENCY RELIABLE SERVICE CAPABILITIES TO JOIN A BSS

(71) Applicant: CANON KABUSHIKI KAISHA, Tokyo (JP)

(72) Inventors: Julien Sevin, Saint Aubin du Cormier (FR); Pascal Viger, Janze (FR); Patrice Nezou, Liffre (FR); Mickaël Lorgeoux, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 18/248,217

(22) PCT Filed: Oct. 14, 2021

(86) PCT No.: PCT/EP2021/078404
§ 371 (c)(1),
(2) Date: Apr. 6, 2023

(87) PCT Pub. No.: WO2022/079149
PCT Pub. Date: Apr. 21, 2022

(65) Prior Publication Data
US 2024/0022947 A1     Jan. 18, 2024

(30) Foreign Application Priority Data

Oct. 14, 2020     (GB) ..................................... 2016288

(51) Int. Cl.
*H04W 4/00*          (2018.01)
*H04W 28/02*        (2009.01)
(Continued)

(52) U.S. Cl.
CPC ....... *H04W 28/0215* (2013.01); *H04W 72/04* (2013.01); *H04W 72/23* (2023.01); *H04W 74/0808* (2013.01)

(58) Field of Classification Search
None
See application file for complete search history.

(56) References Cited

U.S. PATENT DOCUMENTS 10,791,516 B1 *   9/2020   Chu ................... H04W 52/0216
10,952,245 B1 *   3/2021   Smith .................... H04W 72/12
(Continued)

FOREIGN PATENT DOCUMENTS

GB          2561615 A      10/2018
GB          2562076 A      11/2018
(Continued)

OTHER PUBLICATIONS

IEEE P802.11-REVmdTM/D5.0, Sep. 2020 Draft Standard for Information technology—Telecommunications and information exchange between systems Local and metropolitan area networks-Specific requirements. pp. 1-6, Sep. 2020, Retrived form internet: URL: https://ieeexplore.ieee.org/document/9208022.*
(Continued)

*Primary Examiner* — Bob A Phunkulh

(74) *Attorney, Agent, or Firm* — Canon U.S.A., Inc. IP Division

(57) ABSTRACT

A network adopts Low Latency Reliable Service measures to ensure LLRS traffic has priority over not-LLRS traffic. Active measures are applied by stations exchanging LLRS traffic in the network. Passive measures are applied by stations not participating in the LLRS traffic exchange, to reduce use of the medium for exchange of not-LLRS traffic. The LLRS traffic is thus prioritized. The AP declares the LLRS requirements for the non-AP stations to join the BSS, such as the LL measures. A non-AP station wishing to join the BSS declares its LL capabilities to implement LL measures, during an association procedure. The AP decides whether to authorize or refuse the association based on the declared capabilities, thereby building a BSS with non-AP (Continued)

--------▸ Not-LLRS traffic
━━━━▸ LLRS traffic stations that are capable of applying passive LL measures when LLRS traffic is to be exchanged between stations. Achievement of low latency, PDR and jitter requirements is consequently eased.

14 Claims, 9 Drawing Sheets

(51) Int. Cl.

| | | |
|---|---|---|
| *H04W 72/04* | (2023.01) | |
| *H04W 72/23* | (2023.01) | |
| *H04W 74/0808* | (2024.01) | |

(56) References Cited

U.S. PATENT DOCUMENTS

| | | | | |
|---|---|---|---|---|
| 2017/0339680 | A1* | 11/2017 | Jia | H04W 52/0216 |
| 2020/0029350 | A1 | 1/2020 | Asterjadhi et al. | |
| 2020/0077421 | A1 | 3/2020 | Asterjadhi et al. | |
| 2020/0204970 | A1* | 6/2020 | Wei | H04W 72/04 |
| 2020/0267636 | A1 | 8/2020 | Cavalcanti et al. | |
| 2021/0153286 | A1* | 5/2021 | Park | H04W 76/22 |
| 2021/0168825 | A1* | 6/2021 | Morioka | H04W 74/006 |
| 2021/0336827 | A1* | 10/2021 | Park | H04L 1/0069 |
| 2021/0344540 | A1* | 11/2021 | Park | H04L 27/2603 |
| 2022/0110052 | A1* | 4/2022 | Dakshinkar | H04W 52/0206 |
| 2022/0150761 | A1* | 5/2022 | Kim | H04W 24/10 |
| 2022/0240311 | A1* | 7/2022 | Kim | H04W 56/001 |
| 2022/0295332 | A1* | 9/2022 | Kim | H04W 28/0215 |
| 2022/0330262 | A1* | 10/2022 | Kim | H04L 1/00 |
| 2022/0369159 | A1* | 11/2022 | Kim | H04L 1/00 |
| 2022/0377588 | A1* | 11/2022 | Kim | H04W 84/12 |
| 2022/0417793 | A1* | 12/2022 | Kim | H04L 1/0001 |
| 2023/0389000 | A1* | 11/2023 | Dong | H04W 56/0045 |

FOREIGN PATENT DOCUMENTS

| | | | |
|---|---|---|---|
| WO | 2018/156339 | A1 | 8/2018 |
| WO | 2018/160372 | A1 | 9/2018 |
| WO | 2018/193128 | A1 | 10/2018 |

OTHER PUBLICATIONS

Dave Cavalcanti (Intel Corporation); "Low latency service in 802. IIbe"; IEEE Draft; 11-20-0418-04-00BE-LOW-LATENCY-SERVICE-IN-802-IIBE; IEEE-SA Mentor; XP068170515; vol. 802.11 EHT; 802.IIbe, No. 4; Aug. 12, 2020; URL:https://mentor.ieee.org/802. 11/dcn/20/11-20-0418-04-00be-low-latency-service-in-802-llbe. pptx 'retrieved on Aug. 12, 2020); pp. 1-30.

* cited by examiner

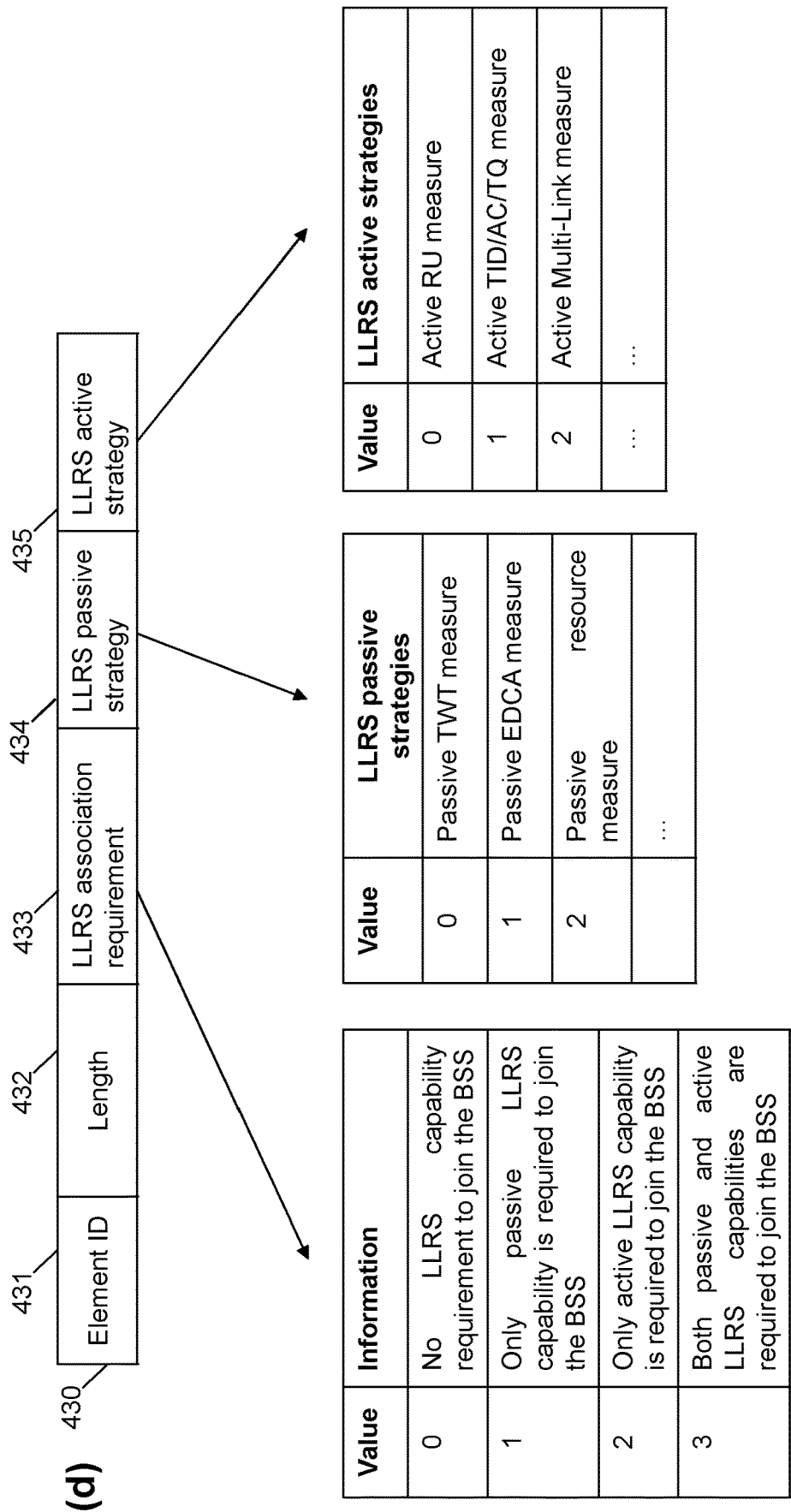

(d)

| Value | LLRS active strategies |
|---|---|
| 0 | Active RU measure |
| 1 | Active TID/AC/TQ measure |
| 2 | Active Multi-Link measure |
| ... | ... |

| Value | LLRS passive strategies |
|---|---|
| 0 | Passive TWT measure |
| 1 | Passive EDCA measure |
| 2 | Passive resource measure |
| | ... |

| Value | Information |
|---|---|
| 0 | No LLRS capability requirement to join the BSS |
| 1 | Only passive LLRS capability is required to join the BSS |
| 2 | Only active LLRS capability is required to join the BSS |
| 3 | Both passive and active LLRS capabilities are required to join the BSS |

Element ID | Length | LLRS association requirement | LLRS passive strategy | LLRS active strategy
431 | 432 | 433 | 434 | 435

430

Figure 4 (seq.)

Figure 5:
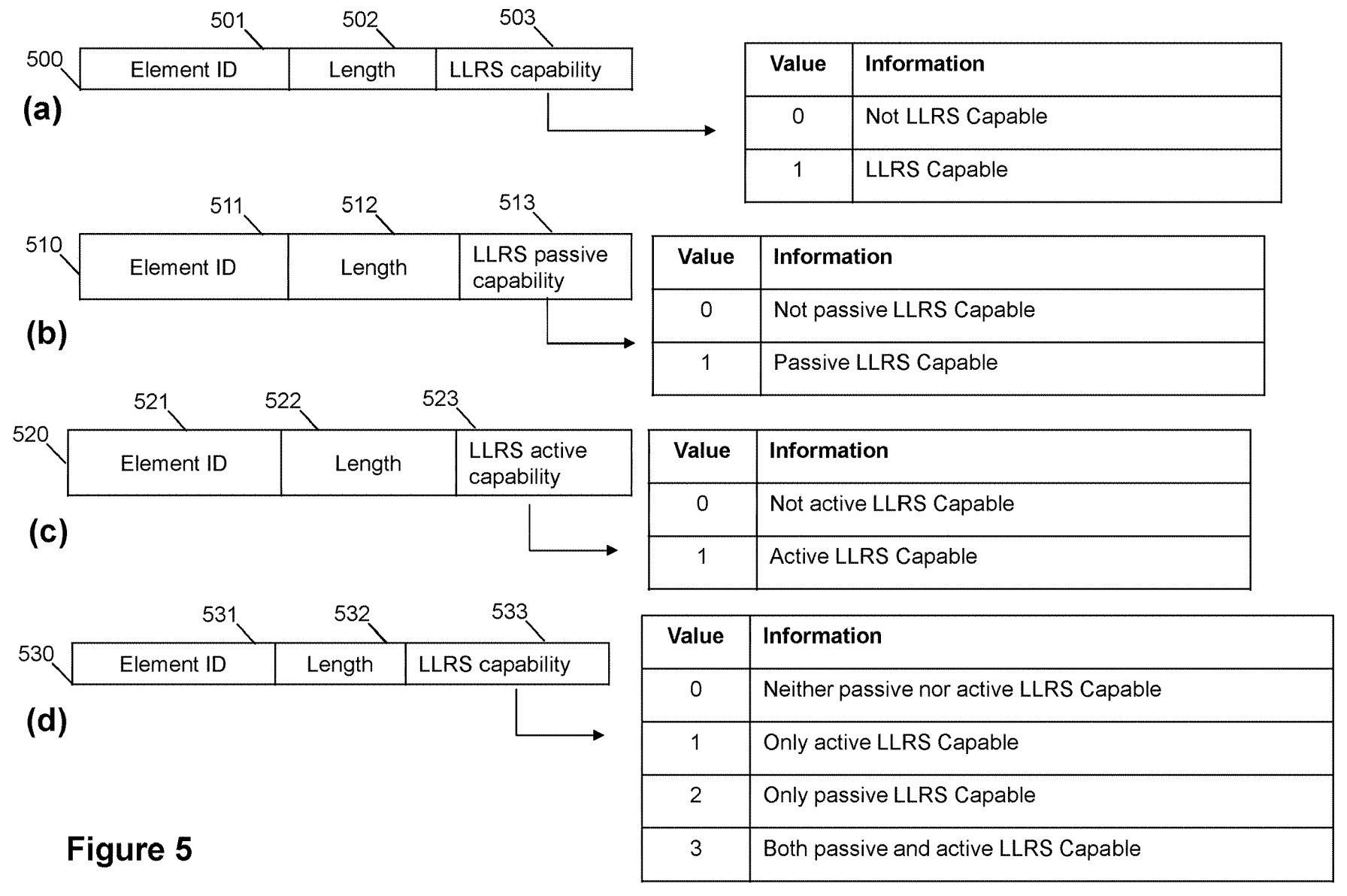

(a)

| Element ID | Length | LLRS capability |
|---|---|---|
| 501 | 502 | 503 |

500

| Value | Information |
|---|---|
| 0 | Not LLRS Capable |
| 1 | LLRS Capable |

(b)

| Element ID | Length | LLRS passive capability |
|---|---|---|
| 511 | 512 | 513 |

510

| Value | Information |
|---|---|
| 0 | Not passive LLRS Capable |
| 1 | Passive LLRS Capable |

(c)

| Element ID | Length | LLRS active capability |
|---|---|---|
| 521 | 522 | 523 |

520

| Value | Information |
|---|---|
| 0 | Not active LLRS Capable |
| 1 | Active LLRS Capable |

(d)

| Element ID | Length | LLRS capability |
|---|---|---|
| 531 | 532 | 533 |

530

| Value | Information |
|---|---|
| 0 | Neither passive nor active LLRS Capable |
| 1 | Only active LLRS Capable |
| 2 | Only passive LLRS Capable |
| 3 | Both passive and active LLRS Capable |

| Value | Information |
|-------|-------------|
| 87 | LLRS capability | Set to 1 to indicate that the non-AP station is LLRS capable. Set to 0 otherwise |

(a)

610

| Value | Information | |
|-------|-------------|---|
| 88 | Passive LLRS capability | Set to 1 to indicate that the non-AP station is passive LLRS capable. Set to 0 otherwise |
| 89 | Active LLRS capability | Set to 1 to indicate that the non-AP station is active LLRS capable. Set to 0 otherwise |

DECLARATION OF LOW LATENCY RELIABLE SERVICE CAPABILITIES TO JOIN A BSS

CROSS-REFERENCE TO RELATED APPLICATIONS

This application is the National Phase application of PCT Application No. PCT/EP2021/078404, filed on Oct. 14, 2021 and titled "DECLARATION OF LOW LATENCY RELIABLE SERVICE CAPABILITIES TO JOIN A BSS". This application claims the benefit under 35 U.S.C. § 119 (a)-(d) of United Kingdom Patent Application No. 2016288.9, filed on Oct. 14, 2020 and titled "DECLARATION OF LOW LATENCY RELIABLE SERVICE CAPABILITIES TO JOIN A BSS". The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The 802.11 family of standards adopted by the Institute of Electrical and Electronics Engineers (IEEE-RTM) provides a great number of mechanisms for wireless communications between stations.

With the development of latency sensitive applications such as online gaming, real-time video streaming, virtual reality, drone or robot remote controlling, better low latency and robustness requirements and issues need to be taken into consideration. For instance, 99.9% of latency sensitive packets should be delivered to the end equipment within a 2 ms latency.

Such problematic issues are currently under consideration by the IEEE 802.11 working group as a main objective to issue the next major 802.11 release, known as 802.11 be or EHT for "Extremely High Throughput".

Low latency reliable services, LLRS, have been defined as targets of such main objective. LLRSs are services provided to a higher layer traffic stream that prioritize and deliver MSDUs (data units) within a worst-case latency budget with a given reliability/packet delivery ratio (PDR) and low jitter.

Some low latency, LL, measures are being studied in order to prioritize LLRS traffic within a BSS (Basic Service Set) with a view of meeting QoS constraints.

Some LL measures, passive measures, may be applied by non-AP stations that do not participate to the LLRS traffic (passive stations), with a view of reducing their impact on the network. An example is provided in the IEEE 802.11-20/1046r2 document where a regular non-AP station shall stop its transmission opportunity, TXOP, before a protected/restricted TWT service period (for LLRS traffic) starts.

Some other LL measures, active measures, may be applied by non-AP stations emitting or receiving the LLRS traffic (active stations). For instance, specific LLRS resources, such as frequency, temporal or spatial resources, may be assigned to LLRS traffic and thus used. An example is provided in the IEEE 802.11-20/0418r4 document where TID>7 is used for LLRS traffic.

An efficient QoS management in the BSS is required to provide LL reliable services.

SUMMARY OF INVENTION

One key issue for an efficient QoS management in a BSS is for the AP to favor stations' behaviors adapted to LLRS traffic, in particular an application of the passive and active measures.

The present invention thus proposes a communication method in a wireless network, comprising at a non-access-point, non-AP, station:

declaring own low latency, LL, capabilities to apply one or more LL measures, to join a basic service set, BSS, managed by an AP, and when LL traffic is to be exchanged between stations of the BSS, applying a LL measure to the effect of reducing the use of a wireless medium by the non-AP station to exchange not-LL traffic in the network.

By this way, the AP is aware of the station's capabilities. The AP may then authorize or not the association of the station with the BSS based on the capabilities. The AP may for instance authorize the stations that guarantee application of (passive) LL measures, hence prioritizing the LLRS traffic vs. their own not-LLRS traffic.

From AP perspective, a communication method in a wireless network is thus proposed that comprises, at the access-point, AP, managing a basic service set, BSS:

receiving, from a non-AP station, a declaration of low latency, LL, capabilities to apply one or more LL measures, and authorising or refusing an association of the non-AP station with the BSS based on the received declaration of LL capabilities.

Correlatively, the invention also provides a wireless communication device comprising at least one microprocessor configured for carrying out the steps of any of the above methods.

Optional features of embodiments of the invention are defined in the appended claims. Some of these features are explained here below with reference to a method, while they can be transposed into device features.

In some embodiments, declaring the own LL capabilities comprises transmitting a management frame, for instance a probe or association request frame, to the AP during an association procedure with the BSS. From AP perspective, the received declaration includes a management frame, for instance a probe or association request frame, sent by the non-AP station during an association procedure with the BSS.

In some embodiments, the (own) LL capabilities are declared using one or more LL bits of an information element in a management frame sent by the non-AP station. For instance, the information element is a dedicated information element.

In a variant, the information element is a P802.11-REVmd/D5.0 existing information element. For example, the existing information element is the Extended Capabilities information element of P802.11-REVmd/D5.0.

According to a particular feature, one LL bit signals the non-AP station is capable to apply LL measures. The signalling is thus general.

In a variant, one LL bit signals the non-AP station is capable to apply passive LL measures when LL traffic is to be exchanged between other stations of the BSS, to the effect of reducing the use of a wireless medium by the non-AP station to exchange not-LL traffic in the network. Each non-AP station can thus declare it is ready to act as a passive station, hence prioritizing the LLRS traffic of the other stations.

Optionally, one LL bit (which may thus be optionally additional) signals the non-AP station is capable to apply active LL measures when it has to exchange LL traffic with another station of the BSS, to the effect of using resources dedicated to LL traffic for exchanging the LL traffic in the network.

In that way, the AP is aware of which non-AP stations could play the role of an active LLRS station and which non-AP station could play the role of a passive LLRS station.

In some embodiments, the method further comprises, at the non-AP station, receiving, from the AP, an advertising frame, for instance a beacon or probe response frame, advertising LL requirements non-AP stations have to comply with to join the BSS, wherein declaring the own LL capabilities is based on the received advertising frame. From AP perspective, the method further comprises, at the AP, emitting an advertising frame, for instance a beacon or probe response frame, advertising LL requirements non-AP stations have to comply with to join the BSS.

In some embodiments, the advertising frame includes an information element dedicated to the LL requirements.

In other embodiments, one LL bit in the advertising frame advertises the non-AP stations have to be capable to apply LL measures.

In some embodiments, one LL bit in the advertising frame advertises the non-AP stations have to be capable to apply passive LL measures when LL traffic is to be exchanged between other stations of the BSS, to the effect of reducing the use of a wireless medium by the non-AP stations to exchange not-LL traffic in the network.

In some embodiments, one LL bit (which may be optionally additional) in the advertising frame advertises the non-AP stations have to be capable to apply active LL measures when they have to exchange LL traffic with another station of the BSS, to the effect of using resources dedicated to LL traffic for exchanging the LL traffic in the network.

Resources dedicated may include dedicated TID or TIDs (transport Identifier), dedicated RU or RUs (resource units in MU OFDMA scheme), dedicated link or links in a multi-link scheme, etc.

In some embodiments, one binary field in the advertising frame advertises one or more LL measures the non-AP stations have to be able to apply.

In that way, the stations wishing to join the BSS are fully aware of the behaviour (LL measures) required to efficiently operate in the BSS (for LLRS traffic purpose).

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 5 illustrates various signalling implementations for declaring LLRS capabilities using a dedicated Information Element, IE;

FIG. 6 illustrates various signalling implementations for declaring LLRS capabilities using additional bits in an IE declaring other station capabilities;

DETAILED DESCRIPTION OF EMBODIMENTS

Figure 1:
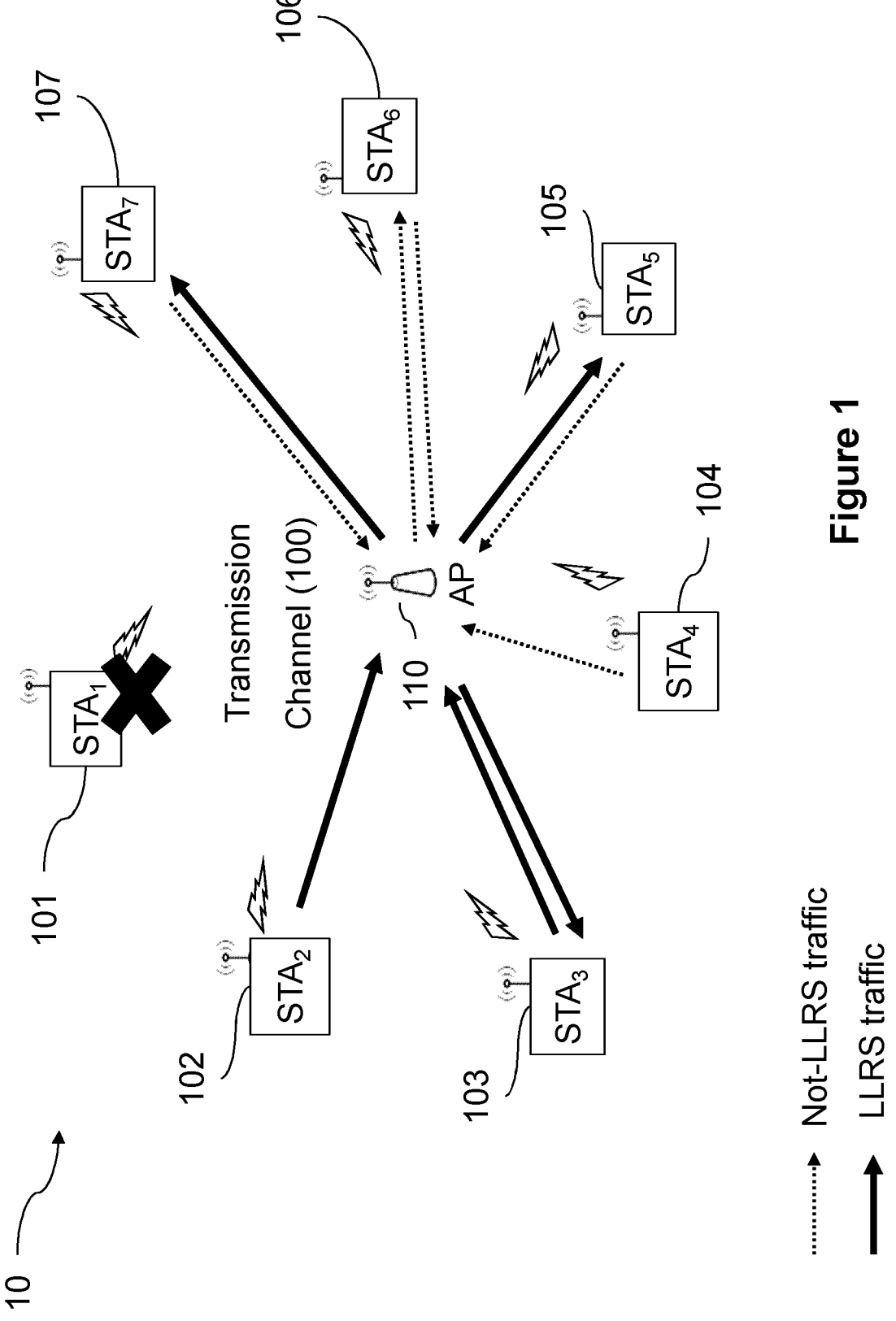
FIG. 1 illustrates a network environment in which embodiments of the invention may be implemented.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. A SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. A SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

An AP manages a set of stations that together organize their accesses to the wireless medium for communication purposes. The stations (including the AP) form a service set, here below referred to as basic service set, BSS (although other terminology can be used). A same physical station acting as an access point may manage two or more BSS (and thus corresponding WLANs): each BSS is thus uniquely identified by a specific basic service set identification, BSSID and managed by a separate virtual AP implemented in the physical AP.

Low latency reliable services, LLRS, are services provided to a higher layer traffic stream that prioritize and deliver MSDUs (data units of this traffic stream) within a worst-case latency budget with a given reliability/packet delivery ratio (PDR) and low jitter. Traffic that may be concerned by LLRS includes latency sensitive data, i.e. data from applications such as gaming, media streaming, augmented reality, virtual reality, and so on.

A communication network should adopt appropriate measures, referred here below to as LLRS or low latency or LL measures, to ensure the LLRS traffic has indeed priority over not-LLRS traffic in the network. Some LL measures may be active measures in that they are to be applied by stations exchanging LLRS traffic in the network. Some LL measures may be passive measures in that they are to be applied by passive non-AP stations, i.e. those of the BSS that do not participate in the LLRS traffic exchange. The passive measures reduce use of the wireless network for exchange of not-LLRS traffic, hence prioritizing the LLRS traffic. Such prioritization favors achievement of PDR and low jitter targets.

The AP of a BSS may declare the LLRS requirements for the non-AP stations to join the BSS, such as the LL measures the non-AP stations will have to apply. A dedicated information element can be used in a management frame, with dedicated bits to declare for instance active and/or passive LL measures to be applied.

A non-AP station wishing to join the BSS can declare its LL capabilities, i.e. its capability to implement LL measures (in general or those or some as declared by the AP) when appropriate. The declaration is made during the association procedure with the BSS in such a way the AP may decide whether to authorize or refuse the requested association based on the declared capabilities.

The AP may therefore build a BSS with non-AP stations that are capable of applying passive LL measures when LLRS traffic is to be exchanged between some stations. Achievement of low latency, PDR and jitter requirements is consequently eased.

FIG. 1 illustrates an exemplary network environment 10 for delivering LLRS traffic, in accordance with one or more example embodiments.

Each communication station 101-107 registers to a central station or access point (AP) 110 during an association procedure where the AP assigns a specific Association IDentifier (AID) to the requesting non-AP station. For example, the AID, e.g. a 16-bit value uniquely identifying the non-AP station, is used to identify the stations in the frame exchanged. The AP 110 and the associated non-AP stations 101-107 may represent a basic service set (BSS) or an extended service set (ESS).

Once associated with the BSS, the communication stations 101-107, 110 exchange data frames over a radio transmission channel 100 of a wireless local area network (WLAN), under the management of the AP 110. The radio transmission channel 100 is defined by an operating frequency band constituted by a single channel or a plurality of channels forming a composite channel.

Non-AP stations may also communicate directly via a direct wireless link (DiL for direct link), i.e. without the intervention of the AP as relay of their messages. Exemplary situation of direct communications includes the presence of peer-to-peer (P2P) transmissions between non-AP stations having the same primary channel.

The stations 101-107, 110 compete one against the other using EDCA (Enhanced Distributed Channel Access) contention, to gain access to the wireless medium 100 in order to be granted a transmission opportunity (TXOP) and then transmit (single-user, SU) data frames. The stations may also use a multi-user (MU) scheme in which a single station, usually the AP 110, is allowed to schedule a MU transmission, i.e. multiple simultaneous transmissions to or from other stations, during a TXOP granted in the wireless network. One implementation of such a MU scheme has been for example adopted in IEEE 802.11ax amendment standard, as the Multi-User Uplink and Downlink OFDMA (MU UL and DL OFDMA) procedures.

The non-AP stations may represent various devices such as gaming client, augmented/virtual reality headset, smart-phones, wireless display and some of them have to exchange (i.e. transmit or/and receives) low-latency or LLRS traffic over time. LLRS traffic has more constrained QoS require-ments regarding for instance PDR, jitter and latency, than not-LLRS traffic coexisting in the WLAN 10.

To prioritize LLRS traffic over not-LLRS traffic, LL or LLRS measures can be implemented within the BSS: active LL measures for the stations (referred to as active stations) exchanging the LLRS traffic and passive LL measures for the non-AP stations (referred to as passive stations) not participating in the LLRS traffic exchange at a given time. Stations may become successively active and passive sta-tions within the same BSS.

Figure 2:
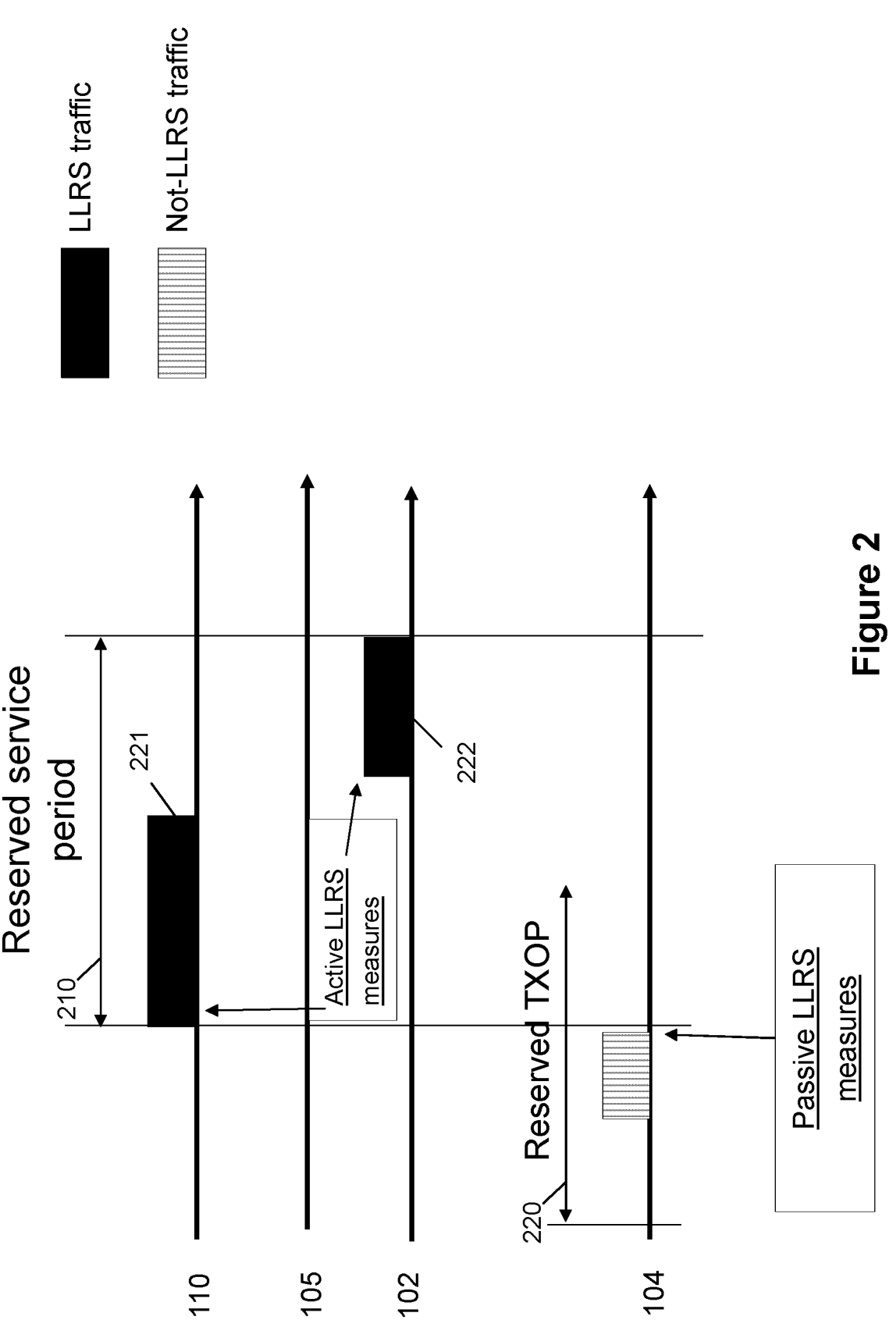
FIG. 2 illustrates some LL measures taken in the BSS in an exemplary scenario where LLRS traffic is transmitted.

FIG. 2 illustrates some LL measures taken in the BSS in an exemplary scenario where LLRS traffic is transmitted.

In this scenario, the AP schedules a reserved service period 210. It may announce the starting time and the ending time of the period. The reserved service period 210 may be fully dedicated to LLRS traffic exchange, or in variant may allow both LLRS traffic and not-LLRS traffic. In the figure, it is a reserved LLRS period.

The AP participates to the LLRS traffic exchange (sends 221 to non-AP station 105 and then receives 222 from non-AP station 102) in the reserved service period. How-ever, this is not mandatory. The reserved LLRS period may alternatively be used by non-AP stations to directly exchange P2P LLRS traffic.

In one embodiment, the reserved service period is a protected TWT service period as presented in the IEEE 802.11-20/1046r2 document.

Previously to the reserved service period, non-AP station 104 gains access to the wireless medium 100 for a TXOP duration and starts transmitting not-LLRS traffic 220.

As station 104 is aware of the scheduled reserved service period 210, it is able to stop its not-LLRS traffic transmis-sion when LLRS traffic is to be exchanged between other stations of the BSS, although its own TXOP is not ending. Such stopping action is a passive LL measure because it reduces the use of the wireless medium by station 104 to exchange not-LLRS traffic in the network. Such reduction mechanism (or measure) gives priority to the LLRS traffic.

AP 110 can next transmit LLRS traffic to non-AP station 105 and then receives other LLRS traffic from non-AP station 102. The stations can apply active LL measures to perform the LLRS traffic exchange, for instance using specific network resources dedicated to LLRS traffic. For instance, resource units (RUs) of an 802.11ax MU OFDMA scheme can be assigned to LLRS traffic and thus be used. Also (in a variant or in combination), a TID (Transport ID) or AC (access category) or transmission queue (TQ) with a specific set of QoS parameters can be dedicated to LLRS traffic and thus be used to easily identify LLRS traffic and give it priority.

The above "passive TWT measure" stopping a current TXOP is only one example of possible passive LL measures. Other passive LL measures may include a "passive EDCA measure" where EDCA parameters or any channel access parameters are modified or degraded. This may for instance be used by the non-AP stations to gain access to the medium during reserved service period 210 allowing both LLRS traffic and not-LLRS traffic: the passive stations with degraded EDCA parameters thus give more priority to the active stations. Degraded EDCA parameters may mean forbidding EDCA access, for instance by setting the AIFS value to the duration of the reserved service period 210. Other passive LL measures may include a "passive resource measure" where a number of network resources used (e.g. a number of links in a multi-link approach, a number of time slots in a time-slotted approach, a number of RUs in a MU OFDMA approach, etc.) is reduced by the station. Of course, any other passive LL measure can be contemplated provided it reduces a use of the wireless medium by the concerned non-AP station for transmitting not-LLRS traffic.

Similarly, the above "active RU measure" and "active TID/AC/TQ measure" are only examples of possible active LL measures. Any other active LL measure can be contem-plated provided it eases transmission of LLRS traffic by using resources dedicated to such traffic. The active RU measure can for instance be extended to a more general "active resource measure" where specific resource or resources (e.g. a link in a multi-link approach, a time slot in a time-slotted approach, a RU in a MU OFDMA approach, etc.) are assigned to LLRS traffic and thus have to be used.

The example of FIG. 2 shows that if station 104 does not apply the passive TWT measure in due time, the LLRS exchange within the reserved service period cannot take place (or at least interference occur), resulting in degraded QoS for the LLRS traffic. Also, if a passive station does not apply the passive EDCA measure (to degrade EDCA param-eters), the active stations will not gain easily access to the medium during a reserved service period. More generally, this example shows that when passive stations do not accept to apply the passive LL measures to reduce their impact on the network and free bandwidth, the LLRS traffic are not given priority, hence the low latency, PDR and jitter require-ments cannot be fulfilled.

A similar consideration can be made for the active sta-tions. An active non-AP station may decide not to activate/ use active LL measures, for instance not penalize its own not-LLRS traffic (as web browsing, mail, etc.). However, this penalizes the overall LLRS efficiency of the network.

Also, the station designed on a previous 802.11 standard (being a non EHT non-AP stations) obviously cannot apply the LL measures. Therefore, they can dramatically degrade the LLRS efficiency in the BSS, should they join it.

The stations that accept and commit to apply the LLRS measures are named LLRS capable stations. A non-AP station may be passive LLRS capable and/or active LLRS capable, with respect to the passive and active LL measures respectively.

As the LLRS not-capable non-AP stations impact directly the performances of LLRS measures, it is preferable that the AP identifies as from the association phase whether a non-AP station is LLRS capable or not. As the LLRS efficiency relies more on the behaviour of the passive non-AP stations, the AP preferably needs to know, for each non-AP stations, whether it is capable to apply active or/and passive LL measures. Based on this information, the AP comes to the decision of authorizing or refusing the asso-ciation to a requesting non-AP station.

Figure 3:
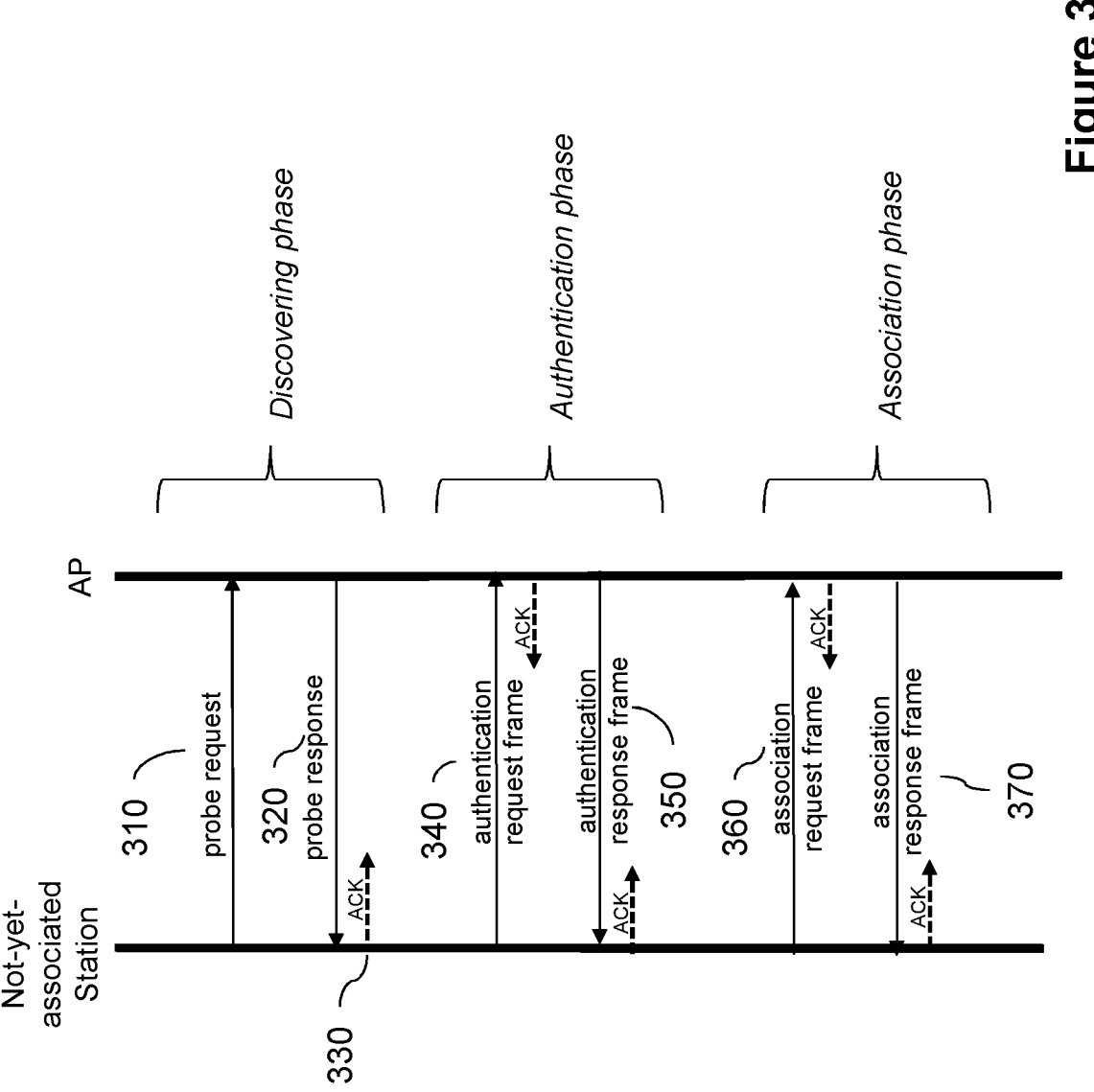
FIG. 3 illustrates an exemplary sequence of management frames allowing a not-yet-associated station to discover and register with an AP managing a BSS.

FIG. 3 illustrates an exemplary sequence of management frames allowing a not-yet-associated station to discover and register with an AP managing a BSS. It comprises three phases: WLAN discovery, authentication and association, at the end of which the non-AP station enters into an authen-ticated and associated state with the AP, should the AP authorizes the association. Note that the station may be currently associated with another AP (of another BSS) and willing to join this BSS.

Prior to association with the AP, the stations gather information about the APs by scanning the channels one by one either through passive scanning (passive discovery procedure) or active scanning (active discovery procedure).

In the passive scanning mode, the station scans through successively each 20 MHz channel and waits to listen for beacon frames (declaring SSID—service set identifier) on the scanned channel, regardless of whether the stations has already connected to a specific SSID before or not.

The beacon frame is a management frame advertising details of the BSS. According to embodiments of the invention, the AP may use the beacon frame to advertise LL requirements non-AP stations have to comply with to join the BSS. Examples of signalling the LL requirements in the management frame sent by the AP are provided below with reference to FIG. 4.

In the active scanning mode, the stations send out probe request frames 310 on each wireless 20 MHz channel. The probe request frames may contain the SSID of a specific WLAN that the station is looking for or the probe request frames may not contain a specific SSID meaning the station is looking for "any" SSID in the vicinity of the station.

In response to receiving a probe request frame, the AP checks whether the station has at least one common supported data rate or not. If there is a compatible data rate, the AP responds with a probe response frame 320, the content of which is similar to a beacon frame: advertising of the SSID (wireless network name), of supported data rates, of encryption types if required, and of other 802.11 capabilities of the AP.

The probe response frame 320 is also a management frame advertising details of the BSS. According to embodiments of the invention, the AP may use the probe response frame 320 to advertise LL requirements non-AP stations have to comply with to join the BSS. Examples of signalling the LL requirements in the management frame sent by the AP are provided below with reference to FIG. 4.

An acknowledgment frame 330 may be sent by the station, in response to receiving the probe response frame 320.

At the reception of the beacon frame or of the probe response frame, the non-AP station may analyse the LL requirements and decide to initiate or not the association procedure with the given AP station.

The second phase is the 802.11 authentication once a WLAN to join has been chosen by the station. As a well-known conventional authentication phase is run, it is not described in details. The station sends a low-level 802.11 authentication request frame 340 to the selected AP. The AP receives the authentication request frame 340 and responds to the station with an authentication response frame 350.

Next, the station has to perform actual association with the AP from the low-level authentication step. This is the next phase of actual 802.11 association by which the station actually joins the WLAN cell, if the AP agrees with. This stage finalizes the security and bit rate options and establishes the data link between the station and the AP. The purpose of this final exchange is for the station to obtain an Association Identifier (AID) to be used to access the medium and send data within the joined WLAN.

To that end, the station sends an association request frame 360 to the selected AP. The association request frame 360 contains chosen encryption types if required and other compatible 802.11 capabilities.

The association request frame 360 is a management frame. According to embodiments of the invention, the non-AP station wishing to join the BSS declares own LLRS capabilities to apply one or more LL measures. It may declare to be passive LLRS capable and/or active LLRS capable, or declare merely it is LLRS capable. Of course, stations that are not LLRS capable will provide a declaration accordingly. Examples of signalling the LLRS capabilities in the management frame sent by the non-AP station are provided below with reference to FIGS. 5 and 6.

In a variant to providing the LLRS capabilities in the association request frame 360, the non-AP station may decide using the probe request frame 310. The latter is also a management frame. Therefore, a similar signalling of the LLRS capabilities can be used. In that scenario, at the reception of the probe request frame, the AP may analyse the LLRS capabilities of the non-AP station and decide to continue or not the association procedure with the non-AP station.

If the elements in the association request frame match the capabilities of the AP, the AP creates an Association ID (AID) for the station and responds with an association response frame 370 with a success message granting network access to the station.

In particular, if the LLRS capabilities declared by the non-AP stations do not match the LLRS requirements of the AP (for instance those declared in the beacon or probe response frame 320), the AP may refuse the association.

More generally, the AP may authorise or refuse an association of the non-AP station with the BSS based on the received declaration of LLRS capabilities.

Preferably, an association refusal is emitted for all the non-AP stations that do not declare at least to be passive LLRS capable. This ensures that all the stations of the BSS will apply the passive LLRS measures and thus prioritize the LLRS traffic.

Once the station is successfully associated with the AP, data transfer can start in the chosen WLAN using the physical medium 100.

The probe response frame 320, authentication request/response frames 340 and 350 and association request/response frames 360 and 370 are unicast management frames emitted in an 802.11 legacy format, known as a single user (SU) format. This is a format used for point-to-point communication (here between the AP and the station). Each of these unicast management frames can be acknowledged by an ACK frame 330.

Figure 4:
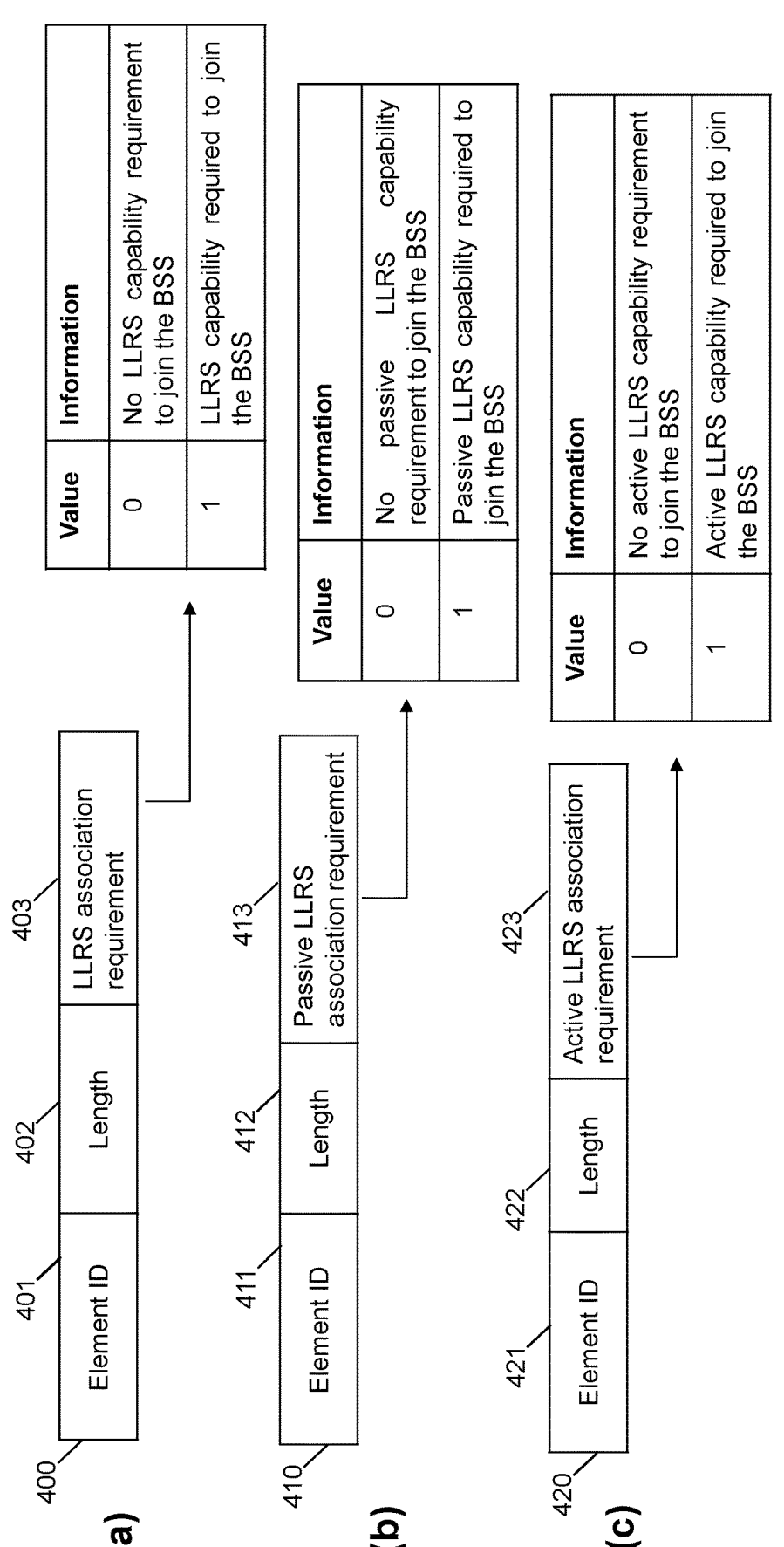
FIG. 4 illustrates various signalling implementations for advertising LLRS requirements for the BSS, in a management frame such as a beacon frame or a probe response frame.

FIG. 4 illustrates various implementations for advertising LLRS requirements for the BSS, in a management frame such as a beacon frame or a probe response frame. As shown, a dedicated information element, IE, is used for the LLRS requirement advertising. Information element are widely used, meaning the dedicated IE can be supplemental to existing IEs in the management frame.

The information element, or IE, is a type-length-value (TLV) item. Of course, any combination of one or more of those parts is possible. For instance, the length value can be omitted if it is fixed and known by all parties.

IE 400, 410, 420, 430 may be referred to as LLRS requirement IEs.

The element ID subfield 401, 411, 421 or 431 identifies the IE as providing LLRS requirements. It may take a value in the range [245-254], so far reserved in the 802.11 standard. For the purpose of illustration, value 247 may be chosen in some embodiments.

The Length subfield 402, 412, 422, 432 indicates the number of bytes forming the IE including the element ID subfield and the Length subfield.

In FIGS. 4a, 4b and 4c, the last subfield 403, 413, 423 is made of a single bit value. It defined a LLRS requirement.

In FIG. 4a, bit 403 advertises whether the non-AP stations have to be capable to apply LL measures to join the BSS (value set to 1) or whether it does not matter (value to 0). At this stage, no distinction is made between active and passive LL measures. The LLRS requirement so defined may thus specify a non-AP station has to be both passive and active LLRS capable to join the BSS. Of course, more flexible approaches may be used, for instances targeting only one of the two capabilities.

In FIG. 4b, bit 413 advertises whether the non-AP stations have to be capable (value set to 1) to apply passive LL measures when LLRS traffic is to be exchanged between other stations of the BSS, to the effect of reducing the use of a wireless medium by the non-AP stations to exchange not-LLRS traffic in the network, or whether it does not matter (value to 0). In other words, the stations have to be passive LLRS capable to join the BSS.

In FIG. 4c, bit 423 advertises whether the non-AP stations have to be capable to apply active LL measures when they have to exchange LLRS traffic with another station of the BSS, to the effect of using resources dedicated to LL traffic for exchanging the LLRS traffic in the network, or whether it does not matter (value to 0). In other words, the stations have to be active LLRS capable to join the BSS.

In embodiments, IEs 410 and 420 are combined within the same management frame, in such a way the AP indicates which one or both of the passive LLRS requirement and the active LLRS requirement is/are needed to join the BSS. In that case, the Element ID subfields 411, 421 take different values to make it possible to distinguish between the passive LLRS requirement and the active LLRS requirement. For instance, Element ID subfield 411 takes value 247 while Element ID subfield 421 takes value 248. Of course, other values within the range [245-254] can be used.

In FIG. 4d, the Value portion of the IE is made of one or more binary subfields 433, 434, 435.

Subfield 433 may be used alone and be made of two bits, one dedicated to advertise whether passive LLRS capability is required or not and another one dedicated to advertise whether active LLRS capability is required or not. It thus combines bits 413 and 423 into a single subfield of a single IE. For instance, value 0 indicates there is no LLRS capability requirement for a non-AP station, to join the BSS; value 1 indicates that a non-AP station shall be passive LLRS capable, to join the BSS; value 2 indicates that a non-AP station shall be active LLRS capable, to join the BSS; and value 3 indicates that a non-AP station shall be both active and passive LLRS capable, to join the BSS.

Optional subfields 434 and 435 are used to advertise which LL measure or measures have to be applied by the non-AP stations. One subfield 434 provides the passive LLRS measure or measures to apply while the other subfield 435 provides the active LLRS measure or measures. Only one of the two subfields may be provided in some embodiments, preferably the passive LLRS measure subfield.

In some embodiments, passive LLRS measure subfield 434 is provided as an additional subfield in the signalling of FIG. 4b when subfield 413 is set to 1. In some embodiments, active LLRS measure subfield 435 is provided as an additional subfield in the signalling of FIG. 4c when subfield 433 is set to 1.

Similarly, passive LLRS measure subfield 434 is provided in IE 430 when subfield 433 is set to 1 or 3. And active LLRS measure subfield 435 is provided in IE 430 when subfield 433 is set to 2 or 3.

As shown in the Figure, different values taken by subfields 434, 435 correspond to different LLRS measures selected. For instance, concerning passive LLRS measure subfield 434, value 0 means the passive TWT measure has to be applied; value 1 means the passive EDCA measure has to be applied; value 2 means the passive resource measure has to be applied, and so on. Concerning active LLRS measure subfield 434, value 0 means the active RU measure has to be applied; value 1 means the active TID/AC/TQ measure has to be applied; value 2 means the active multi-link measure (to select a specific link in a multi-link scheme) has to be applied, and so on.

In variants, subfields 434, 435 may be a binary map where each bit correspond to a LLRS measure (value 1 in the bit means the corresponding LLRS measure is to be applied). This allows several LLRS measures to be simultaneously selected and thus to be applied by the stations.

In one embodiments, the passive and active LLRS measures can be defined within a single field.

Thanks to such signalling by the AP, the non-AP stations wishing to join the BSS clearly know the LLRS requirements they will have to follow, in particular whether and which LLRS measure(s) have to be applied.

FIGS. 5 and 6 illustrate various implementations for declaring the LLRS capabilities by a non-AP station in a management frame. In these implementations, the LLRS capabilities are declared in an information element using one or more LL bits.

The IE may be a dedicated IE, i.e. with the sole usage of declaring station LLRS capabilities. This is the case of FIG. 5 where an entire IE is shown.

In variants, the IE may be an IE already existing in the 802.11 standard, in particular in the P802.11-REVmd/D5.0 version. In that case, the LLRS capabilities supplement already-declared station capabilities. For instance, the IE is the so-called Extended Capabilities information element of P802.11-REVmd/D5.0. In variants, the LL bits may be provided in a new IE, for instance named EHT Capabilities IE, that group not only the LLRS capabilities but additional station's EHT capabilities specific to the 802.11be standard. FIG. 6 illustrates additional bits in an existing IE. However, the same approach can be used for LL bits in a new IE, where the bit numbers may be different from the numbers proposed below.

FIG. 5 illustrates various implementations for declaring LLRS capabilities using a dedicated IE. The IE is a type-length-value (TLV) item, where the length value can be omitted if it is fixed and known by all parties.

IE 500, 510, 520, 530 may be referred to as LLRS capabilities IEs.

The element ID subfield 501, 511, 521 or 531 identifies the IE as providing station LLRS capabilities. It may take a value in the range [245-254], so far reserved in the 802.11 standard. For the purpose of illustration, value 246 may be chosen in some embodiments.

The Length subfield 502, 512, 522, 532 indicates the number of bytes forming the IE including the element ID subfield and the Length subfield.

In FIGS. 5a, 5b and 5c, the last subfield 503, 513, 523 is made of a single bit value. It defines the station LLRS capability.

In FIG. 5a, bit 503 signals whether the non-AP station is capable to apply LL measures (LLRS capable—value set to 1) or not (value to 0). At this stage, no distinction is made between active and passive LLRS capability. This may mean the station has both passive and active LLRS capabilities. In a variant, this may mean the station has at least one of the two capabilities.

In FIG. 5b, bit 513 signals whether the non-AP station is capable to apply passive LL measures when LLRS traffic is to be exchanged between other stations of the BSS, to the effect of reducing the use of a wireless medium by the non-AP station to exchange not-LL traffic in the network (value set to 1), or not (value to 0). In other words, the station declares to be passive LLRS capable or not.

In FIG. 5c, bit 523 signals whether the non-AP station is capable to apply active LL measures when it has to exchange LLRS traffic with another station of the BSS, to the effect of using resources dedicated to LLRS traffic for exchanging the LLRS traffic in the network (value set to 0), or not (value to 0). In other words, the station declares to be active LLRS capable or not.

In embodiments, IEs 510 and 520 are combined within the same management frame, in such a way the non-AP station indicates both of its passive LLRS capability and its active LLRS capability. In that case, the Element ID subfields 511, 521 take different values to make it possible to distinguish between the passive LLRS capability and the active LLRS capability. For instance, Element ID subfield 511 takes value 246 while Element ID subfield 521 takes value 249. Of course, other values within the range [245-254] can be used.

In FIG. 5d, the Value portion of the IE is made of a multibit subfield 533.

Subfield 533 may be made of two bits, one dedicated to declare whether the non-AP station is passive LLRS capable or not and another one dedicated to declare whether the non-AP station is active LLRS capable or not. It thus combines bits 513 and 523 into a single subfield of a single IE. For instance, value 0 indicates the station is not LLRS capable at all; value 1 indicates the station is only active LLRS capable; value 2 indicates the station is only passive LLRS capable; and value 3 indicates the station is both active and passive LLRS capable.

If LLRS measures have been advertised by the AP beforehand (using subfields 434 and 435 above), the station is aware of them and its declaration using the IEs above means it is capable to apply the advertised LLRS measures.

Optional subfields (not shown) may be added (to any of the embodiments of FIGS. 5a to 5d) to declare specifically for which LL measure or measures the station declares to be capable. A signalling similar to subfields 434 and 435 may be used.

FIG. 6 illustrates various implementations for declaring LLRS capabilities using additional bits in an existing IE, for instance the Extended Capabilities information element of P802.11-REVmd/D5.0, section 9.4.2.27.

In FIG. 6a, a single bit 600 is added to the existing IE as a supplemental station capability. In the case of the known Extended Capabilities IE, available bits are from the 87th bit. Bit 87 is thus for instance chosen to signal whether the non-AP station is capable to apply LL measures (LLRS capable—value set to 1) or not (value to 0). At this stage, no distinction is made between active and passive LLRS capability. This may mean the station has both passive and active LLRS capabilities. In a variant, this may mean the station has at least one of the two capabilities.

In FIG. 6b, two bits 610 are added to the existing IE as supplemental station capabilities. In the case of the known Extended Capabilities IE, available bits are from the 87th bit. Bits 88 and 89 are chosen to respectively:

signal whether the non-AP station is capable to apply passive LL measures when LLRS traffic is to be exchanged between other stations of the BSS, to the effect of reducing the use of a wireless medium by the non-AP station to exchange not-LLRS traffic in the network (bit 88 set to 1), or not (bit 88 set to 0). In that way, the station declares to be passive LLRS capable or not, and signal whether the non-AP station is capable to apply active LL measures when it has to exchange LLRS traffic with another station of the BSS, to the effect of using resources dedicated to LLRS traffic for exchanging the LLRS traffic in the network (bit 89 set to 0), or not (bit 89 set to 0). In that way, the station declares to be active LLRS capable or not.

Although FIG. 6b shows the two bits together, embodiments may contemplate using only one of the two bits, for instance for a non-AP station to only declare itself as a passive LLRS capable station or not.

Thanks to such signalling by the non-AP station (FIGS. 5 and 6), the AP becomes aware of which non-AP stations are LLRS capable and which are not, in a way for instance to authorize the association of only (or of a majority) of LLRS capable non-AP stations (or alternatively of non-AP stations that are passive LLRS capable).

Figures 7, 8:
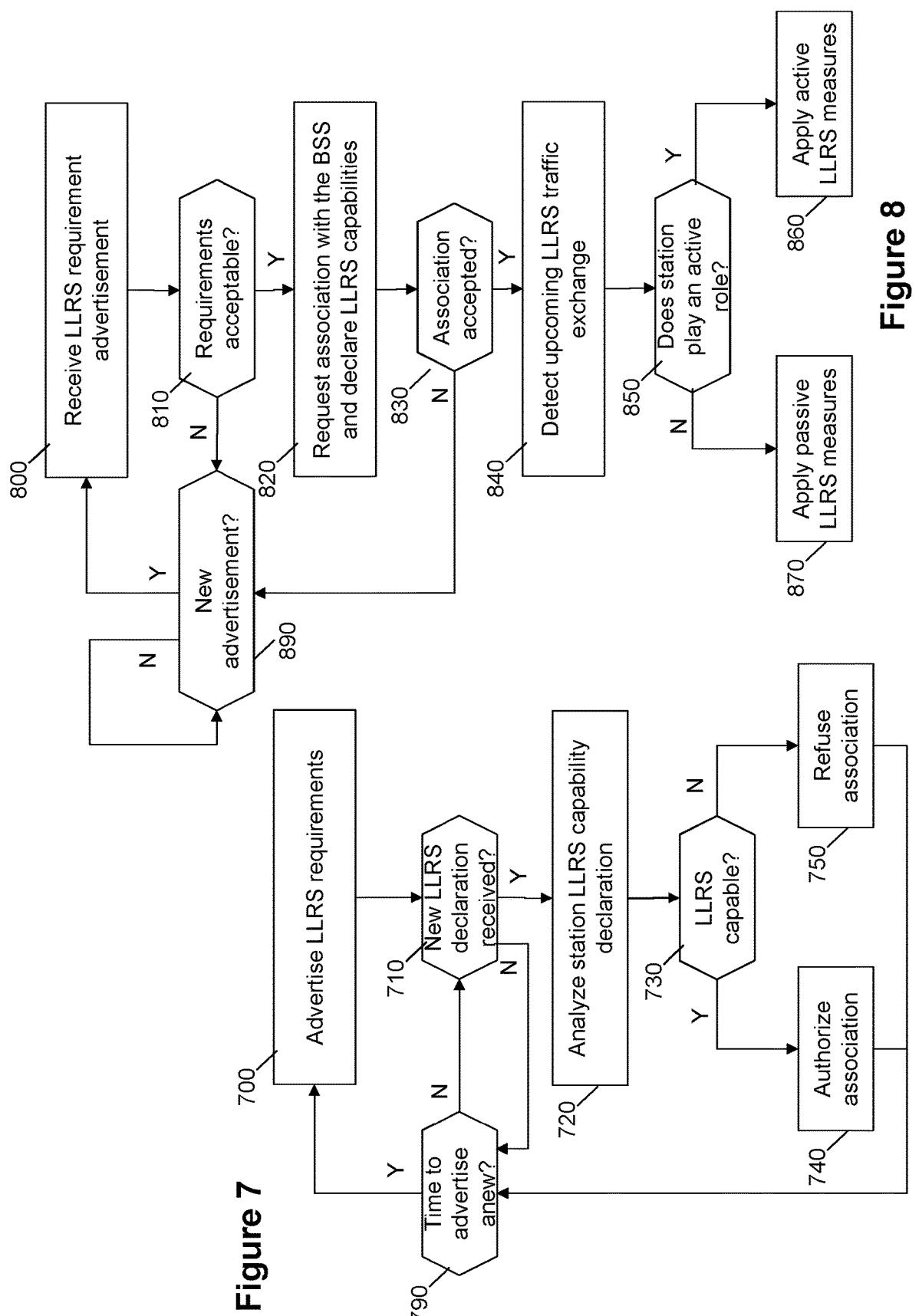
FIG. 7 illustrates, using a flowchart, general steps at the AP according to embodiments of the invention.
FIG. 8 illustrates, using a flowchart, general steps at a non-AP station according to embodiments of the invention.

FIG. 7 illustrates, using a flowchart, general steps at the AP according to embodiments of the invention. FIG. 8 illustrates, using a flowchart, general steps at a non-AP station according to embodiments of the invention.

At step 700, the AP advertises the LLRS requirements for the BSS. This may be done using the signalling described with reference to FIG. 4 in a management frame (e.g. beacon frame). This step is optional as the AP is not forced to advertise the LLRS requirements.

At step 800, a non-AP station wishing to join a BSS receives the management frame from the AP. At step 810, the non-AP station analyses the advertised LLRS requirements and decides whether they are acceptable or not.

In the negative (exit N), the non-AP station does not decide to initiate an association procedure with a view of joining the BSS, and waits for a new advertising frame (e.g. from another AP) at step 890.

In the affirmative (exit Y), the non-AP station initiates the association procedure and declares its LLRS capabilities using for instance the signalling described with reference to FIG. 5 or 6 in a management frame sent to the AP. This is step 820. The management frame may be the association request frame 360.

At step 710, the AP determines whether a LLRS capability declaration is received from the non-AP station. In the negative (exit N), the AP determines at step 790, whether it is time to advertise anew the LLRS requirements of the BSS. In such a case, the AP loops back to step 700, otherwise it waits for receiving a new LLRS capability declaration at step 710.

In the affirmative of step 710 (exit Y), the AP analyses the LLRS capabilities declared by the non-AP station. This is step 720.

For instance, the AP only checks the station is LLRS capable.

In a variant, it checks whether the station is passive LLRS capable.

In another variant, it checks whether the station is both passive and active LLRS capable.

In yet another variant, it checks whether the LLRS measures declared by the station are compatible with the LLRS requirements.

The AP thus decides at step 730 whether the station is sufficiently LLRS capable for the BSS. This decision may also be based on the number of stations already associated with the BSS that have the same LLRS capability profile. For instance, the number of active-only LLRS capable stations should be limited because the LLRS requirements are mainly obtained thanks to the appropriate behaviour of the passive LLRS capable stations.

If the station is determined as being sufficiently LLRS capable, the association is authorized at step 740. Otherwise, it is refused at step 750. Steps 740 and 750 sends the association response frame 370. Next to step 740 or 750, the AP loops back to step 790.

At step 830, the non-AP station receives the association response frame 370 and determines whether the association is granted or not.

In the negative (association refused), the non-AP station loops back to step 800 to try to join another BSS.

In the affirmative, the non-AP station is ready to apply the LLRS measures when appropriate.

For instance, at step 840, the non-AP station detects that LLRS traffic is about to be exchanged in the BSS.

Such detection may for instance be the starting time of a reserved service period 210 scheduled by the AP.

It may also be the local detection of own LLRS traffic to be sent to another station of the BSS. The own LLRS traffic may come from latency sensitive applications of the non-AP station.

At step 850, the non-AP station determines whether it plays an active or passive role in the upcoming LLRS traffic exchange.

In case it is an active station (thus transmitting or receiving the LLRS traffic), it applies at step 860 active LLRS measure or measures. For instance, it uses a dedicated TID>7 for the LLRS traffic to be sent. In a variant or combination, it uses dedicated MU OFMD RUs and/or links in a multi-link scheme. Of course, any other active LLRS measure can be applied.

In case it is a passive station, it applies at step 870 passive LLRS measure or measures. For instance, it stops any pending exchange of not-LLRS traffic when the reserved service period starts. In a variant or in combination, it degrades its EDCA parameters. Of course, any other passive LLRS measure can be applied.

Of course, this Figure contemplates the case where the non-AP station may play the role of an active LLRS capable station and of a passive LLRS capable station.

In case the station has only declared one of the two capabilities, the same flowchart can be used where step 860 is deleted (if the station is only passive LLRS capable) or step 870 is deleted (if the station is only active LLRS capable).

In some variants to FIGS. 7 and 8, it is possible for the non-AP station to declare its LLRS capabilities without or before receiving the LLRS requirements. For instance, as described above, the AP may not advertise any LLRS requirements for the BSS. Similarly, the non-AP station may declare its LLRS capabilities in the probe request frame 310, i.e. before receiving the probe response frame 320 with the LLRS requirements.

Back to FIG. 1, non-AP station 101 may be refused the association with the BSS, for instance due to insufficient (even lack) of LLRS capabilities. Non-AP stations 102-107 are allowed to join the BSS.

As shown in the scenario of FIG. 2 and as depicted in FIG. 1, station 104 only emits not-LLRS traffic and does not receive any traffic. In such situation, it only acts as a passive station, thus applies passive LLRS measures. This is the same for station 106 that emits and receives not-LLRS traffic.

Station 102 only emits LLRS traffic (e.g. during the reserved service period 210) and does not receive any traffic, hence applies active LLRS measures. This is the same for station 103 which emits and receives only LLRS traffic) and for station 105 (which receives LLRS traffic as shown in FIG. 2).

Stations 105 and 107 both act sometimes as active stations and passive stations, depending on which traffic transmission (LLRS or not-LLRS) is concerned.

Figure 9:
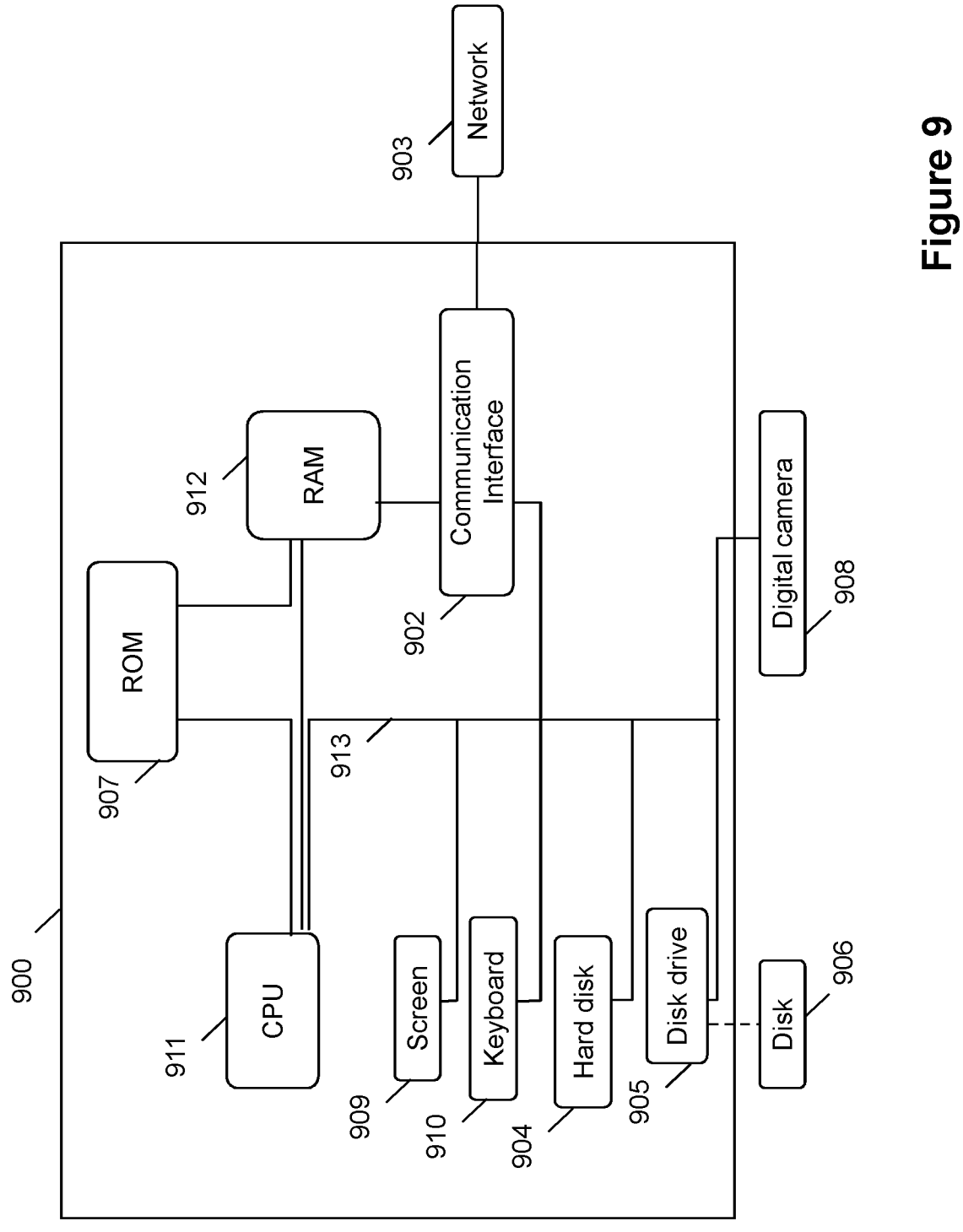
FIG. 9 shows a schematic representation of a wireless communication device in accordance with embodiments of the present invention.

FIG. 9 shows a schematic representation a communication device or station, in accordance with one or more example embodiments of the present disclosure.

The communication device 900 may preferably be a device such as a micro-computer, a workstation or a light portable device. The communication device 900 comprises a communication bus 913 to which there are preferably connected:

- a central processing unit 911, such as a microprocessor, denoted CPU;
- a read only memory 907, denoted ROM, for storing computer programs for implementing the invention;
- a random-access memory 912, denoted RAM, for storing the executable code of methods according to embodiments of the invention as well as the registers adapted to record variables and parameters necessary for implementing methods according to embodiments of the invention; and
- at least one communication interface 902 connected to the radio communication network 100 over which digital data packets or frames or control frames are transmitted, for example a wireless communication network according to the 802.11ax/be protocols. The frames are written from a FIFO sending memory in RAM 912 to the network interface for transmission or are read from the network interface for reception and writing into a FIFO receiving memory in RAM 912 under the control of a software application running in the CPU 911.

Optionally, the communication device 900 may also include the following components:

- a data storage means 904 such as a hard disk, for storing computer programs for implementing methods according to one or more embodiments of the invention;
- a disk drive 905 for a disk 906, the disk drive being adapted to read data from the disk 906 or to write data onto said disk;
- a screen 909 for displaying decoded data and/or serving as a graphical interface with the user, by means of a keyboard 910 or any other pointing means.

The communication device 900 may be optionally connected to various peripherals, such as for example a digital camera 908, each being connected to an input/output card (not shown) so as to supply data to the communication device 900.

Preferably the communication bus provides communication and interoperability between the various elements included in the communication device 900 or connected to it. The representation of the bus is not limiting and in particular the central processing unit is operable to communicate instructions to any element of the communication device 900 directly or by means of another element of the communication device 900.

The disk 906 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 907, on the hard disk 904 or on a removable digital medium such as for example a disk 906 as described previously. According to an optional variant, the executable code of the programs can be received by means of the communication network 903, via the interface 902, in order to be stored in one of the storage means of the communication device 900, such as the hard disk 904, before being executed.

The central processing unit 911 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 904 or in the read only memory 907, are transferred into the random-access memory 912, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network, comprising at a non-access-point, non-AP, station:
  receiving from an AP, an advertising frame advertising LL requirements that non-AP stations have to comply with in order to join a BSS managed by the AP, the advertising frame being a beacon or probe response frame;
  declaring, in a case where the advertised requirements are acceptable, own low latency, LL, capabilities to apply one or more LL measures,
  wherein the own LL capabilities are declared using one or more bits of an information element in a probe or association request frame from the non-AP station to the AP during an association procedure with a BSS managed by the AP, wherein the declared LL capabilities comprise both (i) a passive low-latency capability which is a capability of terminating transmission opportunity (TXOP) before a restricted Target Wake Time (rTWT) service period and (ii) an active low-latency capability which is a capability to send LL traffic using a dedicated multi-user Orthogonal Frequency Division Multiple Access resource unit, MU OFDMA RU, and
  wherein the AP authorizes or refuses an association of the non-AP station with the BSS based on whether the declared bits indicate at least the passive low-latency capability;
  detecting a restricted Target Wake Time (rTWT) service period scheduled by the AP, wherein medium access protection and resource reservation for delivery of latency sensitive traffic are performed during the rTWT service period;
  terminating TXOP of the non-AP station before the detected rTWT service period; and
  applying a LL measure, wherein the LL measure includes using the dedicated MU OFDMA RU, scheduled by the AP within the rTWT service period, to send LL traffic, wherein the MU OFDMA RU is an RU dedicated to low latency traffic for exchanging the LL traffic.

2. The method of claim 1, wherein the information element is a dedicated information element.

3. The method of claim 1, wherein the information element is a P802.11-REVmd/D5.0 existing information element.

4. The method of claim 3, wherein the existing information element is the Extended Capabilities information element of P802.11-REVmd/D5.0.

5. The method of claim 1, wherein one LL bit signals the non-AP station is capable to apply LL measures.

6. The method of claim 1, wherein one LL bit signals the non-AP station is capable to apply passive LL measures when LL traffic is to be exchanged between other stations of the BSS, to the effect of reducing the use of a wireless medium by the non-AP station to exchange not-LL traffic in the network.

7. The method of claim 1, wherein one LL bit signals the non-AP station is capable to apply active LL measures when it has to exchange LL traffic with another station of the BSS, to the effect of using resources dedicated to LL traffic for exchanging the LL traffic in the network.

8. The method of claim 1, wherein the advertising frame includes an information element dedicated to the LL requirements.

9. The method of claim 1, wherein one LL bit in the advertising frame advertises that the non-AP stations have to be capable of applying LL measures.

10. The method of claim 1, wherein one LL bit in the advertising frame advertises that the non-AP stations have to be capable of applying active LL measures when they have to exchange LL traffic with another station of the BSS, to the effect of using resources dedicated to LL traffic for exchanging the LL traffic in the network.

11. The method of claim 1, wherein one binary field in the advertising frame advertises one or more LL measures that the non-AP stations have to be able to apply.

12. A wireless communication device comprising at least one microprocessor configured for carrying out the steps of the method of claim 1.

13. A non-transitory computer-readable medium storing a program which, when executed by a microprocessor or computer system in a wireless device, causes the wireless device to perform the method of claim 1.

14. A communication method in a wireless network comprising, at an access-point, AP:

transmitting an advertising frame advertising LL requirements that non-AP stations have to comply with to join a BSS managed by the AP, the advertising frame being a beacon or probe response frame;

in a case where the advertised requirements are acceptable for a non-AP station, receiving, from the non-AP station, a declaration of low latency, LL, capabilities to apply one or more LL measures, wherein the LL capabilities of the non-AP station are declared using one or more bits of an information element in a probe or association request frame from the non-AP station to the AP during an association procedure with a BSS managed by the AP, wherein the declared LL capabilities comprise both (i) a passive low-latency capability which is a capability of terminating transmission opportunity (TXOP) before a restricted Target Wake Time (rTWT) service period and (ii) an active low-latency capability which is a capability to send LL traffic using a dedicated multi-user Orthogonal Frequency Division Multiple Access resource unit, MU OFDMA RU, and wherein the AP authorizes or refuses an association of the non-AP station with the BSS based on whether the declared bits indicate at least the passive low-latency capability;

scheduling the rTWT service period, wherein medium access protection and resource reservation for delivery of latency sensitive traffic are performed during the rTWT service period; and scheduling, within the rTWT service period, the dedicated MU OFDMA RU, for a LL-capable non-AP station to apply a LL measure, wherein the LL measure includes using the dedicated MU OFDMA RU to send LL traffic, wherein the MU OFDMA RU is an RU dedicated to low latency traffic for exchanging the LL traffic and TXOP of the non-AP station is terminated before the rTWT service period.

* * * * *